(12) United States Patent
Tanaka et al.

(10) Patent No.: US 10,461,480 B1
(45) Date of Patent: Oct. 29, 2019

(54) SHIELD CONNECTOR

(71) Applicant: Yazaki Corporation, Tokyo (JP)

(72) Inventors: Yasuhiro Tanaka, Shizuoka (JP);
Noboru Hayasaka, Shizuoka (JP);
Toru Suzuki, Shizuoka (JP); Yuuhei Takeshita, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/459,801

(22) Filed: Jul. 2, 2019

Related U.S. Application Data

(63) Continuation of application No. PCT/JP2018/001412, filed on Jan. 18, 2018.

(30) Foreign Application Priority Data

Feb. 6, 2017 (JP) .................................. 2017-019945
Jun. 7, 2017 (JP) .................................. 2017-112316

(51) Int. Cl.
*H01R 13/6592* (2011.01)
*H01R 13/6581* (2011.01)
*H01R 4/18* (2006.01)
*H01R 9/05* (2006.01)
*H01R 13/6593* (2011.01)

(52) U.S. Cl.
CPC .......... *H01R 13/6592* (2013.01); *H01R 4/18* (2013.01); *H01R 13/6581* (2013.01); *H01R 9/0527* (2013.01); *H01R 13/6593* (2013.01)

(58) Field of Classification Search
CPC ... H01R 9/032; H01R 9/0527; H01R 13/6593
See application file for complete search history.

(56) References Cited

U.S. PATENT DOCUMENTS 7,666,032 B2 *  2/2010  Aoki ...................... H01R 9/032
                                                    29/844
8,986,045 B2 *  3/2015  Okamoto ........... H01R 13/6593
                                                    439/607.41

(Continued)

FOREIGN PATENT DOCUMENTS

JP    2014-026880 A    2/2014
JP    2014-160576 A    9/2014

(Continued)

OTHER PUBLICATIONS

International Search Report of PCT/JP2018/001412 dated Feb. 27, 2018.

*Primary Examiner* — Tho D Ta
(74) *Attorney, Agent, or Firm* — Sughrue Mion, PLLC

(57) ABSTRACT

A shield connector includes a braided conductor through which an electric wire is inserted; a shield shell formed in a tubular shape that has conductivity; and a ring formed in a tubular shape in which a pressing surface that faces the shield shell in an axial direction of the shield shell is formed on an inner surface side over an entire periphery. The pressing surface is inclined in a direction intersecting with the axial direction on a section in the axial direction. The ring is fixed to the shield shell while maintaining a state in which the pressing surface presses the braided conductor against the shield shell in the axial direction over the entire periphery.

6 Claims, 13 Drawing Sheets

(56) References Cited

U.S. PATENT DOCUMENTS

| | | | | |
|---|---|---|---|---|
| 9,472,901 B2 * | 10/2016 | Wang | ................... | H01R 13/648 |
| 2008/0113559 A1 * | 5/2008 | Hamai | ................. | H01R 9/0527 |
| | | | | 439/607.41 |
| 2016/0100509 A1 | 4/2016 | Yanagihara et al. | | |
| 2016/0181735 A1 | 6/2016 | Higashi et al. | | |

FOREIGN PATENT DOCUMENTS

| | | |
|---|---|---|
| JP | 2015-002089 A | 1/2015 |
| JP | 2016-167351 A | 9/2016 |
| WO | 2015/041213 A1 | 3/2015 |

\* cited by examiner

SHIELD CONNECTOR

CROSS-REFERENCE TO RELATED APPLICATION

This application is a continuation application of International Application PCT/JP2018/001412, filed on Jan. 18, 2018 which claims the benefit of priority from Japanese Patent application No. 2017-19945 filed on Feb. 6, 2017 and Japanese Patent application No. 2017-112316 filed on Jun. 7, 2017 and designating the U.S., the entire contents of which are incorporated herein by reference.

BACKGROUND OF THE INVENTION

1. Field of the Invention

The present invention relates to a shield connector.

2. Description of the Related Art

Conventionally, a shield connector that includes a member for fixing a braided conductor to a shield shell has been known. Japanese Patent Application Laid-open No. 2016-167351 discloses a technique of a fixing member that presses a braided wire against a shell main body and brings the braided wire into contact with the shell main body, by being fitted to the outer periphery of the shell main body while the braided wire is interposed between the fixing member and the shell main body of the shield shell.

There is still room for improvement in fixing a braided conductor to a shield shell. For example, it is preferable to suppress variations in the contact state of the braided conductor to the shield shell.

SUMMARY OF THE INVENTION

An object of the present invention is to provide a shield connector capable of suppressing variations in the contact state of the braided conductor to the shield shell.

In order to solve the above mentioned problem and achieve the object, a shield connector according to one aspect of the present invention includes a braided conductor through which an electric wire is inserted; a shield shell formed in a tubular shape that has conductivity; a ring formed in a tubular shape in which a pressing surface that faces the shield shell in an axial direction of the shield shell is formed on an inner surface side over an entire periphery, wherein the pressing surface is inclined in a direction intersecting with the axial direction on a section in the axial direction, the ring is fixed to the shield shell while maintaining a state in which the pressing surface presses the braided conductor against the shield shell in the axial direction over the entire periphery, the shield shell includes a hole part penetrating in a radial direction, and the ring includes a hooking part that is folded toward a radial direction and fixed to the shield shell when the hooking part being folded is inserted into the hole part.

According to another aspect of the present invention, in the shield connector, it is preferable that the hooking part is a chip that is formed on the ring and extends in a circumferential direction, being folded in a radial direction and inserted into the hole part.

According to still another aspect of the present invention, in the shield connector, it is preferable that the shield shell includes a support surface, the support surface and the pressing surface interposing the braided conductor therebetween, and the support surface is inclined in a direction intersecting with the axial direction on a section in the axial direction.

In order to achieve the object, a shield connector according to still another aspect of the present invention includes a braided conductor through which an electric wire is inserted; a shield shell formed in a tubular shape that has conductivity; a ring formed in a tubular shape in which a pressing surface that faces the shield shell in an axial direction of the shield shell is formed on an inner surface side over an entire periphery, wherein biasing means for biasing the ring to press the braided conductor toward the shield shell in the axial direction, the biasing means being provided on at least one of the ring and the shield shell; the pressing surface is inclined in a direction intersecting with the axial direction on a section in the axial direction, the ring is fixed to the shield shell while maintaining a state in which the pressing surface presses the braided conductor against the shield shell in the axial direction over the entire periphery, the shield shell includes a hole part penetrating in a radial direction, the ring includes a hooking part folded inwardly in the radial direction and inserted into the hole part, the biasing means includes the hole part and the hooking part, and at least one of the hole part and the hooking part includes a tapered shape part inclined relative to a circumferential direction, on at least a part of a side edge part extending in the circumferential direction, and the biasing means generates a component force in the axial direction in the hooking part, when a side edge part of the hooking part being folded is pressed against a side edge part of the hole part.

According to still another aspect of the present invention, in the shield connector, it is preferable that at least one of the hole part and the hooking part further includes a straight shape part that extends in a circumferential direction and is connected to the tapered shape part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a shield connector according to an embodiment of the present invention will be described in detail with reference to the accompanying drawings. It is to be understood that this invention is not limited to the embodiment. Moreover, components described in the following embodiment include components that can be easily assumed by those skilled in the art, or components that are substantially the same.

Embodiment

Figure 1:
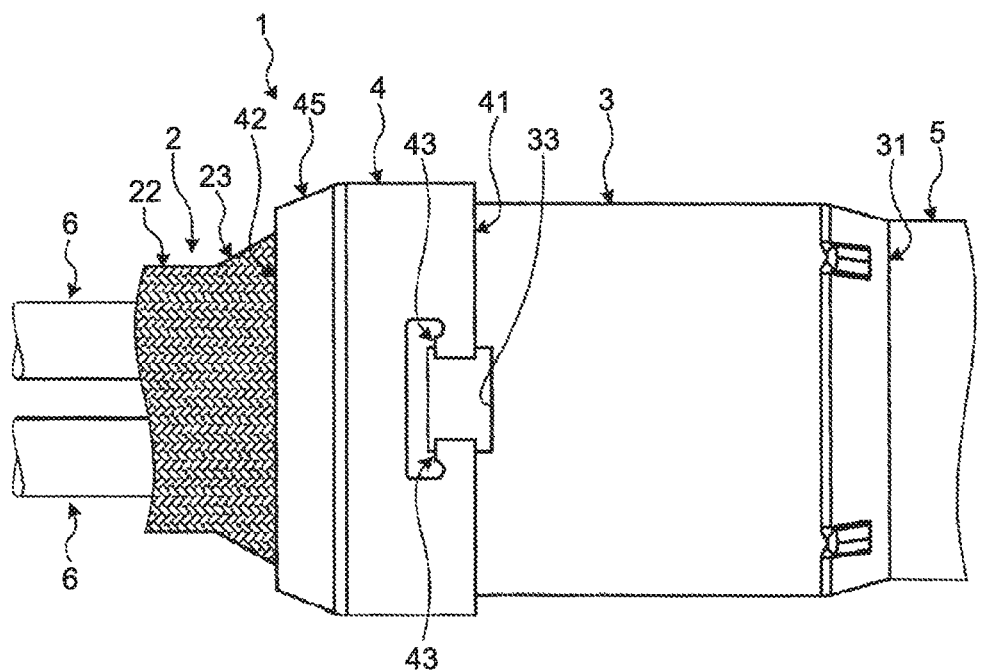
FIG. 1 is a plan view of a shield connector according to an embodiment.
Figure 2:
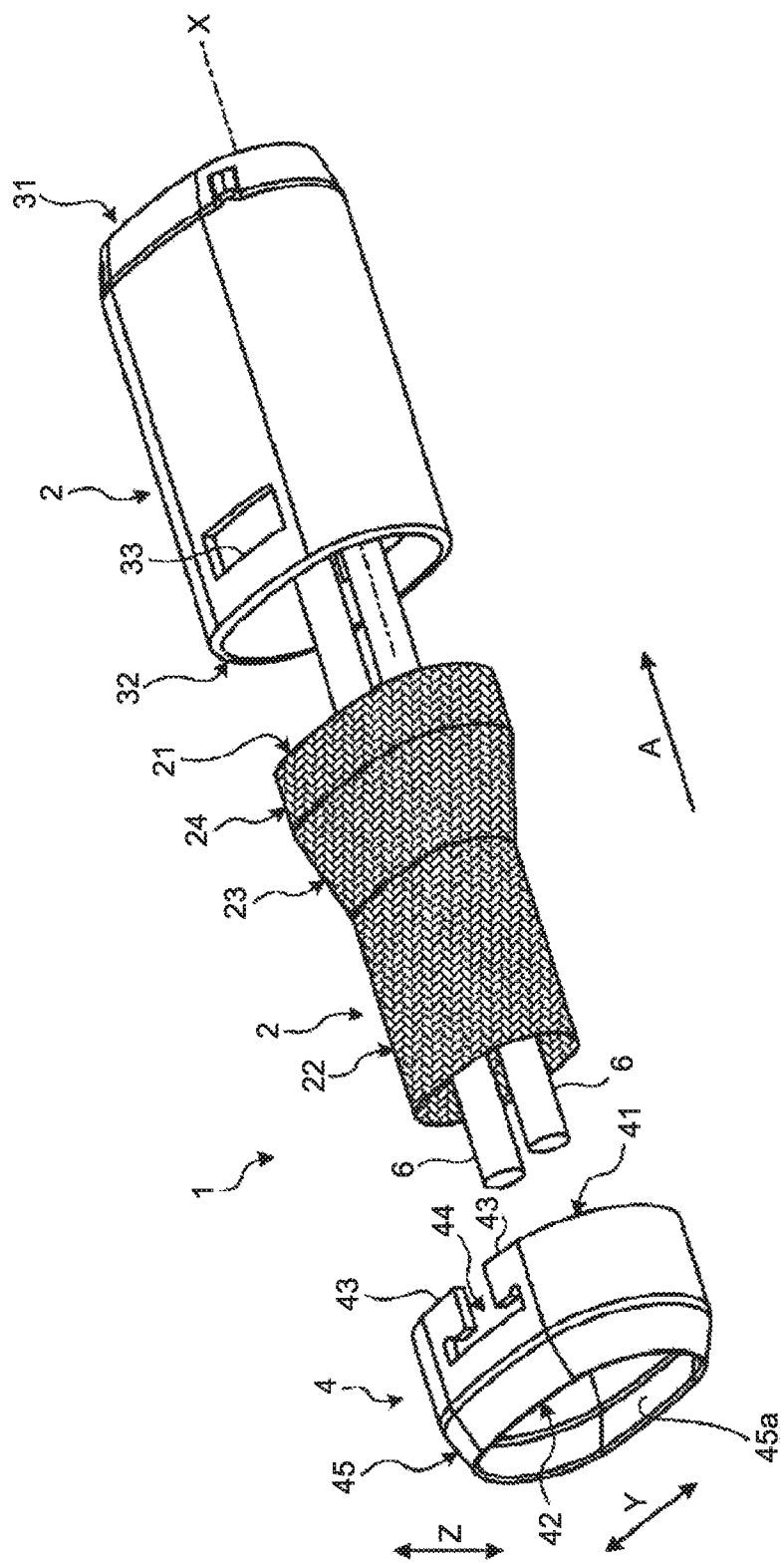
FIG. 2 is an exploded perspective view of the shield connector according to the embodiment.
Figure 3:
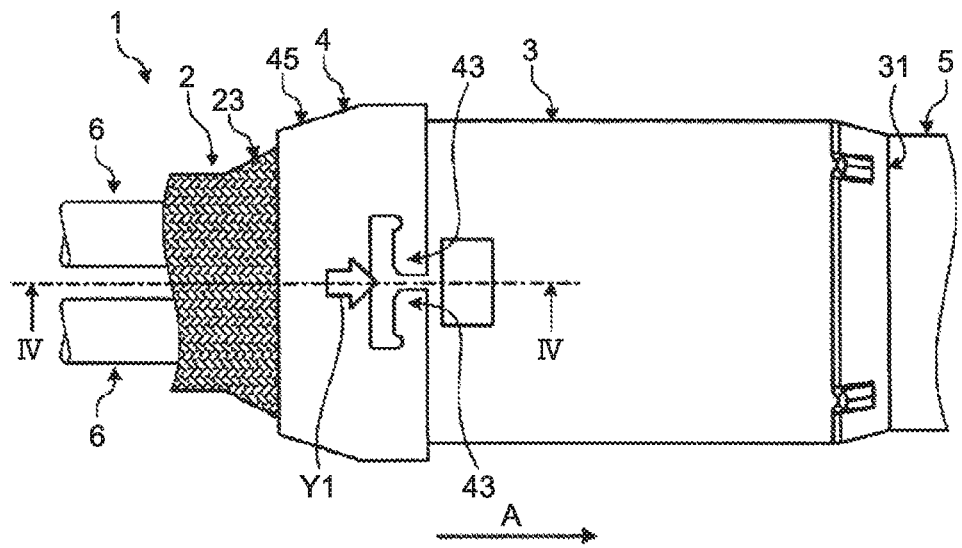
FIG. 3 is a plan view for explaining an assembly of the shield connector according to the embodiment.
Figure 4:
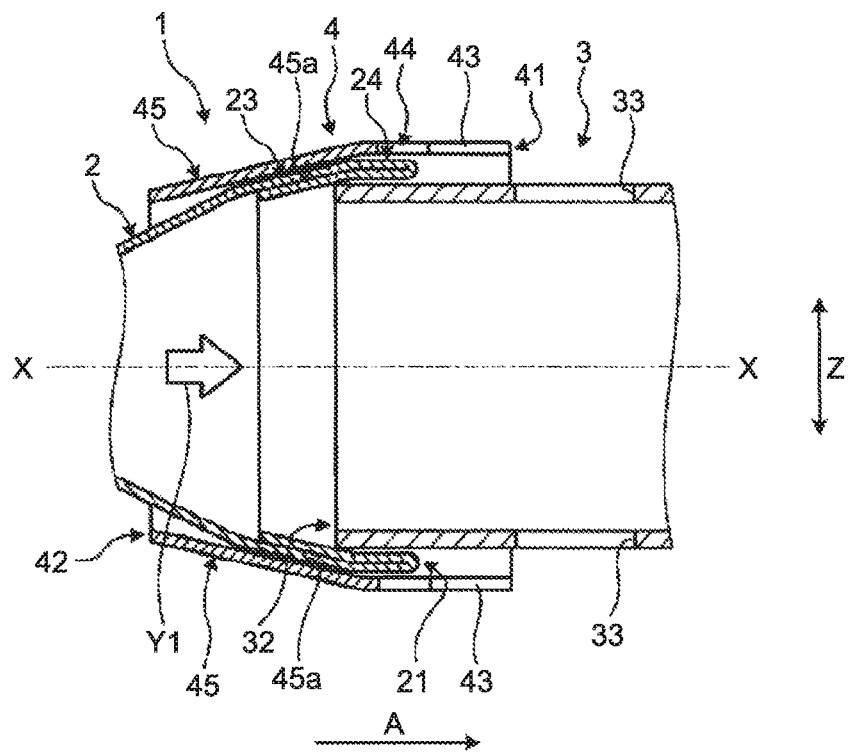
FIG. 4 is a sectional view for explaining the assembly of the shield connector according to the embodiment.
Figure 5:
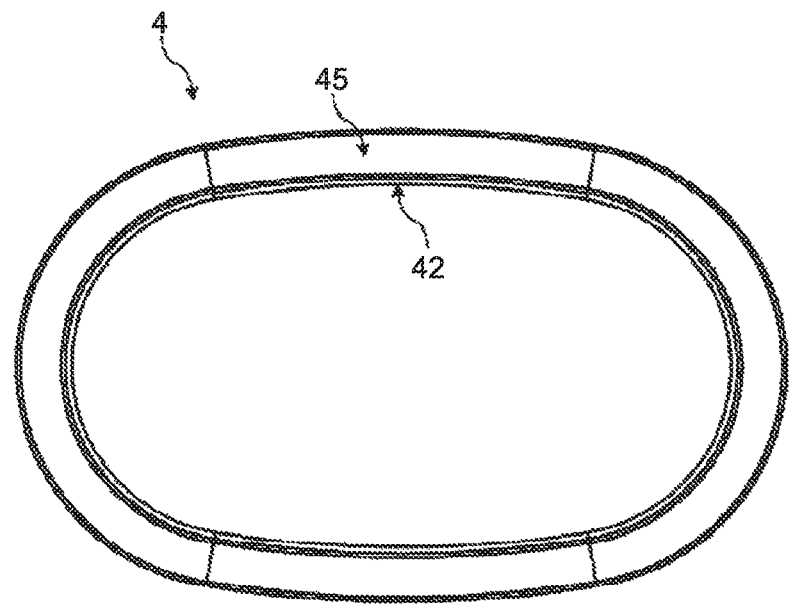
FIG. 5 is a front view of a ring according to the embodiment.

An embodiment will now be described with reference from FIG. 1 to FIG. 5. The present embodiment relates to a shield connector. FIG. 1 is a plan view of a shield connector according to the embodiment. FIG. 2 is an exploded perspective view of the shield connector according to the embodiment. FIG. 3 is a plan view for explaining an assembly of the shield connector according to the embodiment. FIG. 4 is a sectional view for explaining the assembly of the shield connector according to the embodiment. FIG. 5 is a front view of a ring according to the embodiment. FIG. 4 illustrates a section cut along the line IV-IV in FIG. 3.

As illustrated in FIG. 1 and FIG. 2, a shield connector 1 according to the present embodiment includes a braided conductor 2, a shield shell 3, a ring 4, and a housing 5. The shield connector 1 configures a shield circuit that shields noise by being electrically connected to the braided conductor 2. The ring 4 is assembled to the shield shell 3 with the braided conductor 2 interposed therebetween. The ring 4 is assembled to the shield shell 3 in a direction indicated by an arrow A in FIG. 2. In the following explanation, the direction indicated by the arrow A is simply referred to as an "assembly direction A". The assembly direction A is a direction along an axial direction X of the shield shell 3.

In the ring 4, an end portion in the assembly direction A is referred to as a "front end 41", and an end portion at a side opposite to the front end 41 is referred to as a "rear end 42". Similarly, in the shield shell 3, an end portion in the assembly direction A is referred to as a "front end 31", and an end portion at a side opposite to the front end 31 is referred to as a "rear end 32". An end portion of the braided conductor 2 in the assembly direction A is referred to as a "front end 21".

The braided conductor 2 is a tubular-shaped conductor in which a plurality of braided wires are braided in a crossing manner. The braided wires of the braided conductor 2 are made of conductive metal such as copper and aluminum. The cross-sectional shape of the braided conductor 2 of the present embodiment is an oval shape or a shape similar to an oval shape. However, the cross-sectional shape of the braided conductor 2 is not limited to those exemplified, and may also be a circular shape or another shape. An electric wire 6 is inserted through a hollow part of the braided conductor 2. For example, the electric wire 6 is a coated electric wire including a conductive core line and an insulating coating that covers the core line. A terminal is electrically connected to the end portion of the electric wire 6. The terminal is held by a terminal holding part formed on the housing 5. For example, the housing 5 is fastened to a housing of a power supply unit and the like.

The shield shell 3 is a tubular-shaped member. The shield shell 3 is formed of a conductive material. The shield shell 3 of the present embodiment is formed of conductive metal such as copper and aluminum. The cross-sectional shape of the shield shell 3 of the present embodiment is an oval shape or a shape similar to an oval shape. However, the cross-sectional shape of the shield shell 3 is not limited to those exemplified, and may also be a circular shape or another shape. In the shield shell 3 and the ring 4, the long axis direction of the cross-sectional shape is referred to as a "lateral direction Y", and the short-axis direction of the cross-sectional shape is referred to as a "height direction Z". The lateral direction Y is a longitudinal direction of the cross-sectional shape of the shield shell 3 and the ring 4. When the cross-sectional shape of the shield shell 3 and the ring 4 is an oval shape, the long axis direction becomes the lateral direction Y, and the short axis direction becomes the height direction Z.

The shield shell 3 includes a hole part 33. The hole part 33 is formed on an end portion of the shield shell 3 at the rear end 32 side, in other words, at a side where the braided conductor 2 is connected. The hole part 33 penetrates through a metal plate that configures the shield shell 3 in the plate thickness direction, and communicates between the internal space of the shield shell 3 and the outer space. In other words, the hole part 33 penetrates through the shield shell 3 in a radial direction of the shield shell 3. Two hole parts 33 are provided on the shield shell 3 of the present embodiment. Each of the hole parts 33 is disposed on an end portion of the shield shell 3 in the height direction Z. That is, the hole part 33 is disposed on the shield shell 3 at a portion with a small curvature, in other words, at a portion where the degree of curvature is moderate. The two hole parts 33 face each other in the height direction Z with the axis of the shield shell 3 interposed therebetween. The shape of the hole part 33 of the present embodiment is a rectangular shape.

The ring 4 is a tubular-shaped member. For example, the ring 4 is formed of conductive metal such as copper and aluminum. The cross-sectional shape of the ring 4 of the present embodiment is an oval shape or a shape similar to an oval shape. However, the cross-sectional shape of the ring 4 is not limited to those exemplified, and may be a circular shape or another shape. The cross-sectional shape of the ring 4, the cross-sectional shape of the shield shell 3, and the cross-sectional shape of the braided conductor 2 are corresponding to one another.

The ring 4 includes two sets of a pair of hooking parts 43 and 43. Each of the hooking parts 43 is disposed at the front end 41 of the ring 4. The pair of hooking parts 43 and 43 are disposed on end portions of the ring 4 in the height direction Z. That is, the hooking part 43 is disposed on the ring 4 at a portion with a small curvature, in other words, at a portion where the degree of curvature is moderate. A substantially T-shaped notch 44 is formed on the front end 41 of the ring 4 so as to leave the hooking part 43. The pair of hooking parts 43 and 43 extend in the circumferential direction of the ring 4 toward the other hooking part 43. In other words, tip ends of the pair of hooking parts 43 and 43 face each other in the circumferential direction of the ring 4 with the notch 44 interposed therebetween. One hooking part 43 of the pair of hooking parts 43 and 43 projects toward one side in the lateral direction Y, and the other hooking part 43 projects toward the other side in the lateral direction Y.

A tapered part 45 is provided at the rear end 42 side of the ring 4. The tapered part 45 is inclined toward the inside in the radial direction from the front end 41 side to the rear end 42 side. Consequently, the cross-sectional area of the inside of the tapered part 45 is reduced from the front end 41 side toward the rear end 42 side. The cross-sectional shapes of the tapered part 45 at the positions in the axial direction X are formed so as to be similar to one another. A pressing surface 45a is a surface that faces the inside of the tapered part 45 in the radial direction. The pressing surface 45a faces the rear end 32 of the shield shell 3 in the axial direction X of the shield shell 3. The pressing surface 45a is an annular surface, and is an inclined surface inclined relative to the axial direction X. As will be described below, the pressing surface 45a in the ring 4 presses the braided conductor 2 against the shield shell 3.

The braided conductor 2 includes a main body part 22, a tapered part 23, and an edge part 24. The main body part 22 is a portion that covers the electric wire 6. The edge part 24 is a portion that covers the rear end 32 side of the shield shell 3. The tapered part 23 is a portion that connects between the main body part 22 and the edge part 24. The cross-sectional area of the inside of the tapered part 23 is reduced from the edge part 24 toward the main body part 22. As illustrated in FIG. 4, in the edge part 24 and the tapered part 23, the end portion of the braided conductor 2 is folded inwardly to form a double layer.

An assembly method of the shield connector 1 of the present embodiment will now be described. As illustrated in FIG. 2, the electric wire 6 assembled with the braided conductor 2 is inserted through the shield shell 3. The terminal attached to the electric wire 6 is inserted into a terminal holding part of the housing 5. The housing 5 is fixed to the front end 31 side of the shield shell 3. A portion of the shield shell 3 at the rear end 32 side is inserted into the edge part 24 of the braided conductor 2. Moreover, the ring 4 through which the braided conductor 2 is inserted is assembled to the shield shell 3. The ring 4 covers the rear end 32 side of the shield shell 3 so that the braided conductor 2 is interposed between the ring 4 and the shield shell 3. In other words, the rear end 32 of the shield shell 3 is inserted into the ring 4 from the front end 41 side of the ring 4 while being covered by the braided conductor 2.

As illustrated by the arrow Y1 in FIG. 3 and FIG. 4, the ring 4 is fitted to the shield shell 3 by being pressed toward the shield shell 3 in the assembly direction A. For example, this fitting process is performed by a worker using a jig. The fitting process may also be performed by an assembly device. The ring 4 pressed in the assembly direction A and the rear end 32 of the shield shell 3 interpose the braided conductor 2 therebetween. As illustrated in FIG. 4, the pressing surface 45a of the ring 4 faces the rear end 32 of the shield shell 3 in the axial direction X, and the braided conductor 2 is interposed between the pressing surface 45a and the rear end 32.

The ring 4 is pressed in the assembly direction A up to a position where the hooking part 43 of the ring 4 faces the hole part 33 of the shield shell 3. When the hooking part 43 and the hole part 33 face each other in the height direction Z, a caulking process for folding the hooking part 43 is performed. In the caulking process, the pair of hooking parts 43 and 43 are folded in the radial direction so that the base end portions of the pair of hooking parts 43 and 43 are bent substantially at right angles, and are each inserted into the hole part 33. The folded hooking part 43 projects into the hollow part of the shield shell 3 via the hole part 33.

The folded hooking part 43 is engaged by the hole part 33, and restricts the relative movement of the ring 4 relative to the shield shell 3 in the disengaging direction. The ring 4 is fixed to the shield shell 3 in the axial direction X while the braided conductor 2 is pressed against the shield shell 3. In other words, the hooking part 43 after the caulking restricts the relative movement of the shield shell 3 and the ring 4 in the axial direction X, and maintains the electrical connection state between the braided conductor 2 and the shield shell 3. In the present embodiment, the caulking structure in which the shield shell 3 and the ring 4 are caulked is configured so that the compressive stress in the axial direction X still remains in the braided conductor 2 after caulking. More specifically, after caulking, a state in which the braided conductor 2 is compressed by the pressing surface 45a of the ring 4 and the rear end 32 of the shield shell 3 is maintained. The positions of the hooking part 43 and the hole part 33 are designed so that the compressive stress in the axial direction X applied to the braided conductor 2 in the fitting process still remains after caulking. In other words, the hole part 33 is engaged with the hooking part 43, and restricts the relative movement of the shield shell 3 and the ring 4 in the axial direction X at the position where the compressive stress still remains in the braided conductor 2. Consequently, when the caulking process is finished, and even after the pressing force in the axial direction X is not applied from outside, the state in which the pressing surface 45a and the shield shell 3 press the braided conductor 2 in the axial direction X is maintained.

Moreover, in the shield connector 1 of the present embodiment, the pressing surface 45a of the ring 4 is continuously provided over the entire periphery. As illustrated in FIG. 5, the tapered part 45 is formed in an annular shape when viewed in the axial direction. Furthermore, the tapered part 45 is formed so as to face the rear end 32 of the shield shell 3 in the assembly direction A. The tapered part 45 faces the entire periphery of the rear end 32, while the shield shell 3 is inserted into the ring 4. When the ring 4 is pressed toward the shield shell 3 in the assembly direction A, the pressing surface 45a of the tapered part 45 formed in this manner and the shield shell 3 interpose the braided conductor 2 therebetween over the entire periphery. In other words, the rear end 32 of the shield shell 3 receives the pressing force from the pressing surface 45a over the entire periphery.

As illustrated in FIG. 4, the pressing surface 45a of the present embodiment is inclined relative to the axial direction X on a section in the axial direction X. More specifically, the pressing surface 45a is inclined so as the pressing surfaces 45a are brought closer to each other, in other words, is inclined so as to come close to the axial center of the ring 4, from the front end 41 side toward the rear end 42 side. Because the pressing surface 45a is inclined, when the ring 4 is pressed in the assembly direction A during the fitting process, the position of the axial center of the ring 4 is automatically adjusted so as the pressing force is dispersed over the entire periphery. Consequently, the ring 4 is capable of pressing the braided conductor 2 toward the rear end 32 of the shield shell 3 by an even pressing force over the entire periphery.

For example, the caulking process is performed using a caulking jig. In the caulking process, the jig comes into contact with the hooking part 43 by moving in the height direction Z, and folds the hooking part 43 inwardly in the radial direction. The ring 4 is caulked to the shield shell 3, when the folded hooking part 43 is inserted into the hole part 33. The pressing jig and the caulking jig may be integrally formed. The caulking process may be performed by the assembly device. When the fitting process and the caulking process are performed, the shield shell 3, the braided conductor 2, and the ring 4 are integrated with one another, and a shielding unit that shields the electric wire 6 from noise is formed.

As described above, the shield connector 1 of the present embodiment includes the braided conductor 2 through which the electric wire 6 is inserted, the tubular-shaped shield shell 3 that has conductivity, and the tubular-shaped ring 4 that includes the pressing surface 45a formed on the inner surface side over the entire periphery. The pressing surface 45a is a surface that faces the shield shell 3 in the axial direction X of the shield shell 3. The pressing surface 45a may also be an annular surface. The pressing surface 45a is inclined in a direction intersecting with the axial direction X on a section in the axial direction X. The sectional shape of the pressing surface 45a on the section in the axial direction X is not limited to the linear shape illustrated in the example, and may also be curved. The ring 4 is fixed to the shield shell 3 while maintaining the state in which the pressing surface 45a presses the braided conductor 2 against the shield shell 3 in the axial direction X over the entire periphery.

In the shield connector 1 of the present embodiment, the pressing surface 45a of the ring 4 and the shield shell 3 interpose the braided conductor 2 therebetween over the entire periphery. Consequently, the ring 4 is capable of pressing the braided conductor 2 against the shield shell 3 over the entire periphery, and generating compression stress in the braided conductor 2. The ring 4 is assembled to the shield shell 3 so as to maintain the state in which the braided conductor 2 is pressed against the shield shell 3 in the axial direction X. Because the pressing force for pressing the braided conductor 2 toward the shield shell 3 still remains, the electrical connection between the braided conductor 2 and the shield shell 3 can be easily stabilized. In other words, the shield connector 1 of the present embodiment is capable of suppressing variations in the contact state of the braided conductor 2 to the shield shell 3 by the pressing force in the axial direction X that still remains after caulking. Consequently, the shield connector 1 of the present embodiment is capable of stabilizing the electrical connection between the braided conductor 2 and the shield shell 3, and improving the shielding property.

Moreover, in the shield connector 1 of the present embodiment, the pressing surface 45a of the ring 4 is the inclined surface inclined in the direction intersecting with the axial direction X of the shield shell 3. Because the pressing surface 45a is inclined, the compressive stress of the braided conductor 2 that is pressed against the shield shell 3 is evenly dispersed in the circumferential direction.

Furthermore, in the shield connector 1 of the present embodiment, the shield shell 3 includes the hole part 33 penetrating in the radial direction. The ring 4 includes the hooking part 43 folded in the radial direction. When the folded hooking part 43 is inserted into the hole part 33, the ring 4 is fixed to the shield shell 3. In the assembling (fitting process) of the braided conductor 2 to the shield shell 3, the pressing force that presses the braided conductor 2 toward the shield shell 3 is the force in the axial direction X of the shield shell 3. Consequently, it is possible to provide a release structure in the shield shell 3. Moreover, only a small pressing force for folding the hooking part 43 is required for the force in the plate thickness direction (radial direction) during caulking. Thus, the shield connector 1 of the present embodiment does not require a core when the ring 4 is caulked to the shield shell 3.

Still furthermore, when the entire ring 4 is compressed and deformed by sandwiching the ring 4, the braided conductor 2, the shield shell 3, and the core between the upper and lower molds as in a general caulking, a protruded part will be generated by caulking. When the protruded part is projected toward the outside in the radial direction, the physical size of the shield connector 1 will be increased. Alternatively, in the shield connector 1 of the present embodiment, the pressing force is applied mainly to the hooking part 43. Because there is no need to deform the entire ring 4 during the caulking process, the protruded part will not be generated, and the physical size of the shield connector 1 is hard to be increased.

Still furthermore, in the shield connector 1 of the present embodiment, the hooking part 43 is a chip that extends in the circumferential direction of the ring 4, and is folded in the radial direction and inserted into the hole part 33. Consequently, even a force in a direction opposite to the assembly direction A is applied to the ring 4, the shape of the folded hooking part 43 does not easily return to the original shape. The force in the disengaging direction applied to the ring 4 is a force in the direction intersecting with the plate thickness direction of the folded hooking part 43. Thus, the hooking part 43 has enough rigidity against the force in the disengaging direction, and is capable of restricting the ring 4 from being disengaged.

First Modification of Embodiment

Figure 6:
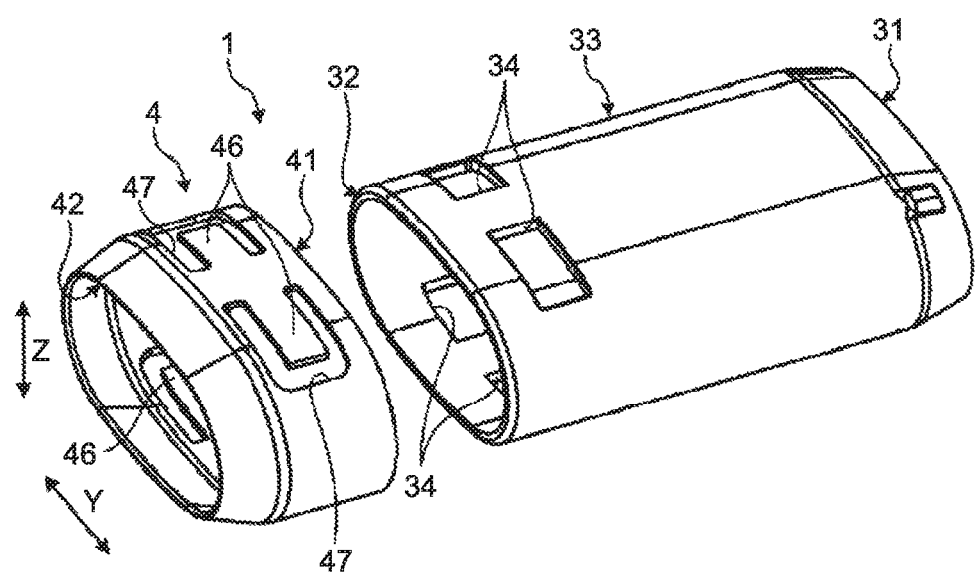
FIG. 6 is a perspective view of a shield shell and a ring according to a first modification of the embodiment.
Figure 7:
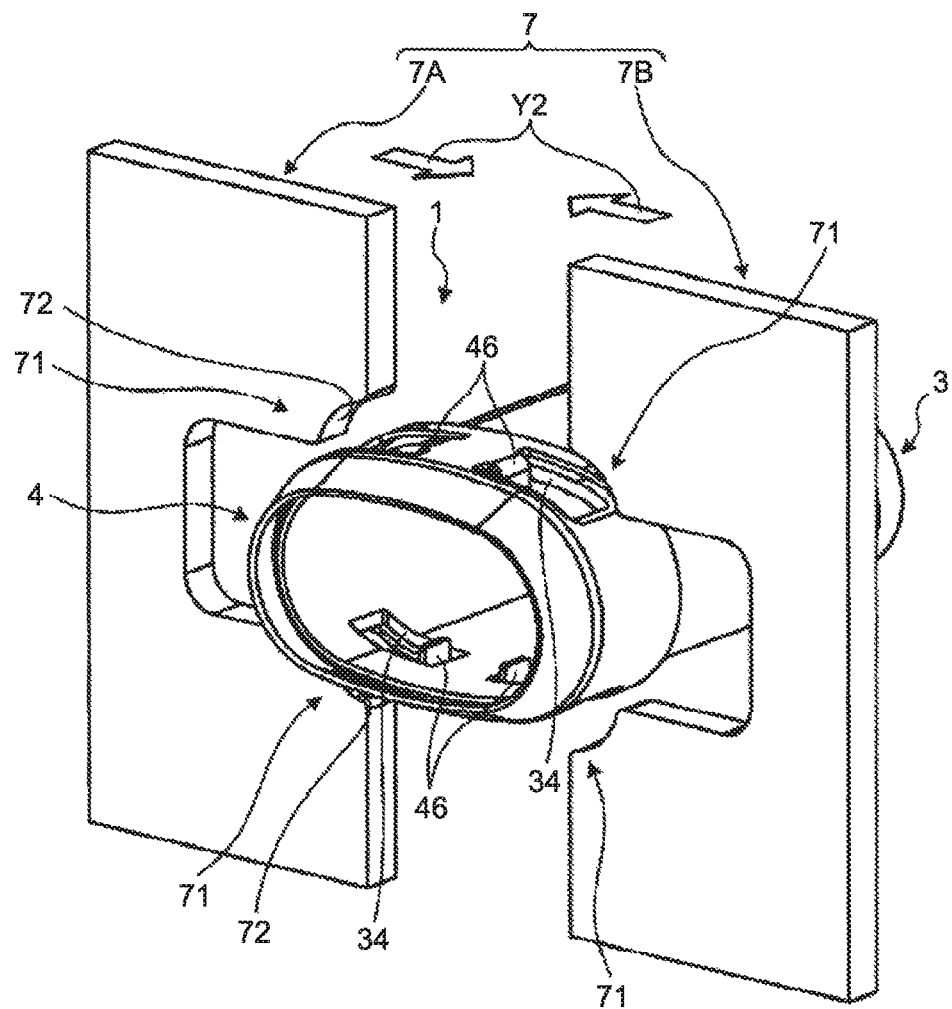
FIG. 7 is a perspective view illustrating a caulking process in the first modification of the embodiment.

A first modification of the embodiment will now be described. FIG. 6 is a perspective view of a shield shell and a ring according to the first modification of the embodiment. FIG. 7 is a perspective view illustrating a caulking process in the first modification of the embodiment. The shield connector 1 of the first modification differs from that of the embodiment described above in having a hole part 34 in the shield shell 3 and a hooking part 46 in the ring 4.

In the ring 4 of the first modification, a pair of hooking parts 46 and 46 extend in a direction separating from each other in the circumferential direction. A C-shaped hole part 47 is formed in the ring 4 so as to leave the hooking part 46. The pair of hooking parts 46 and 46 are disposed so that the base end parts are adjacent to each other. The pair of hooking parts 46 and 46 project in a direction away from the other hooking part 46 in the circumferential direction. Two sets of the pair of hooking parts 46 and 46 are formed on the ring 4. The two sets of the hooking parts 46 and 46 face each other in the height direction Z.

The two sets of the pair of hole parts 34 and 34 are formed in the shield shell 3 in the first modification. The pair of hole parts 34 and 34 are provided adjacent to each other in the circumferential direction. The pair of hole parts 34 and 34 are formed at positions that face the pair of hooking parts 46 and 46, when the shield shell 3 is inserted into the ring 4. In the shield connector 1 of the first modification, similar to the embodiment described above, the ring 4 is assembled to the shield shell 3 while the ring and the rear end 32 of the shield shell 3 interpose the braided conductor 2 therebetween.

For example, the caulking process in which the ring 4 is caulked to the shield shell 3 is performed using a jig 7 illustrated in FIG. 7. In FIG. 7, the shape of the hooking part 46 is the shape after the caulking. Moreover, in FIG. 7, the electric wire 6 and the braided conductor 2 are omitted so that the inside state of the shield connector 1 after the caulking can be easily understood. The jig 7 includes pressing members 7A and 7B having symmetrical shapes. The pressing members 7A and 7B each include a pressing part 71 that presses and folds the hooking part 46. The pressing part 71 includes a curved surface 72 that comes into contact with the hooking part 46. The hooking part 46 that is brought into contact with the curved surface 72 is folded inwardly in the radial direction by the curved surface 72. The pressing members 7A and 7B interpose the ring 4 therebetween while moving in the direction so as to come close to each other, as illustrated by arrows Y2. In this process, the curved surface 72 of the pressing part 71 presses the hooking part 46, folds the hooking part 46, and inserts the hooking part 46 into the hole part 34.

In the present modification, the pressing members 7A and 7B fold the hooking part 46 while moving in the lateral direction Y. In other words, the pressing force applied to the ring 4 from the pressing members 7A and 7B is the force in the lateral direction Y. The cross-sectional shape of the ring 4 is an oval shape the lateral direction Y of which is the long axis direction. In other words, in the ring 4, the rigidity against the pressing force in the lateral direction Y is greater than the rigidity against the pressing force in the height direction Z. Consequently, when the direction of the pressing force for folding the hooking part 46 is the lateral direction Y as in the present modification, there is an effect that the main body portion of the ring 4 is hard to be deformed during the caulking process. Thus, with the configuration of the present modification, unintended deformation is hard to occur in the shield connector 1 during the caulking process. As a result, it is possible to stabilize and improve the quality of the shield connector 1.

Second Modification of Embodiment

Figure 8:
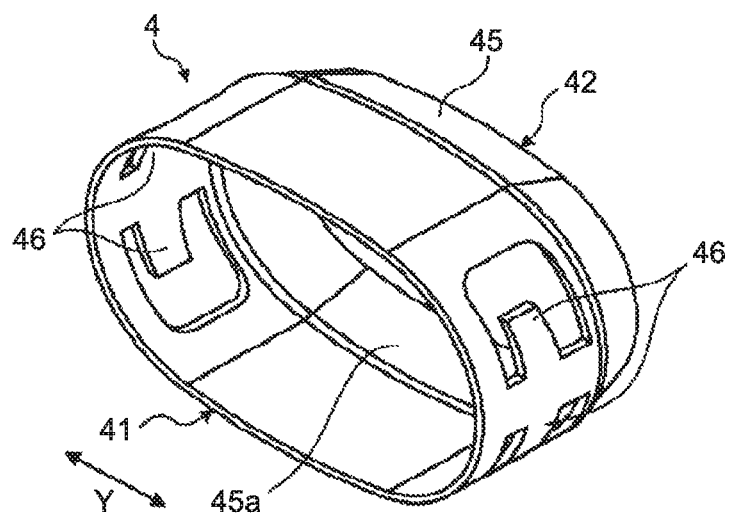
FIG. 8 is a perspective view of a ring according to a second modification of the embodiment.

A second modification of the embodiment will now be described. FIG. 8 is a perspective view of a ring according to the second modification. As illustrated in FIG. 8, the pair of hooking parts 46 and 46 may also be disposed on end portions of the ring 4 in the lateral direction Y. The hooking part 46 of the second modification is disposed on the ring 4 at a portion with a large curvature, in other words, at a portion where the degree of curvature is sharp. Instead of the position illustrated in FIG. 6, the hole part 34 of the shield shell 3 is provided at a position corresponding to the hooking part 46 of the second modification, in other words, at an end portion of the shield shell 3 in the lateral direction Y. In the present modification also, similar to the first modification described above, the direction of the force of folding the hooking part 46 is in the lateral direction Y. Consequently, unintended deformation is hard to occur in the shield connector 1 during the caulking process.

Third Modification of Embodiment

Figure 9:
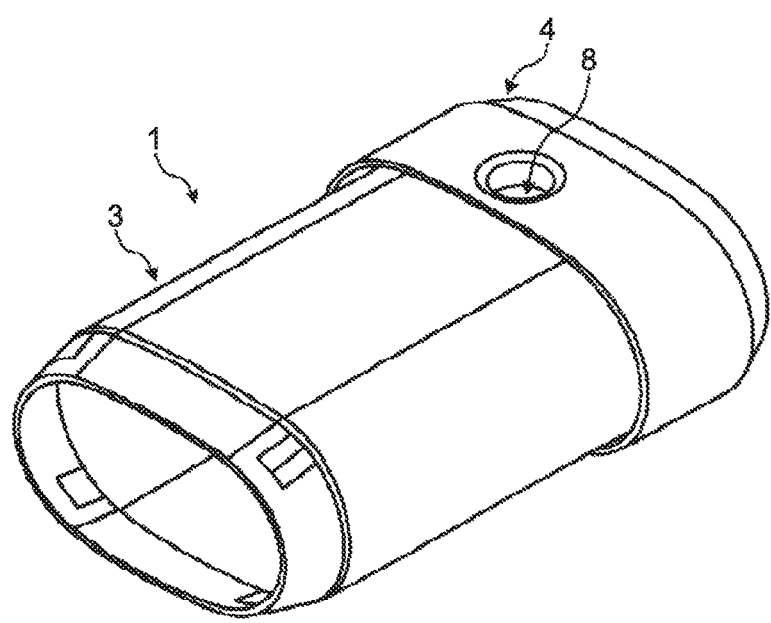
FIG. 9 is a perspective view of a shield connector according to a third modification of the embodiment.
Figure 10:
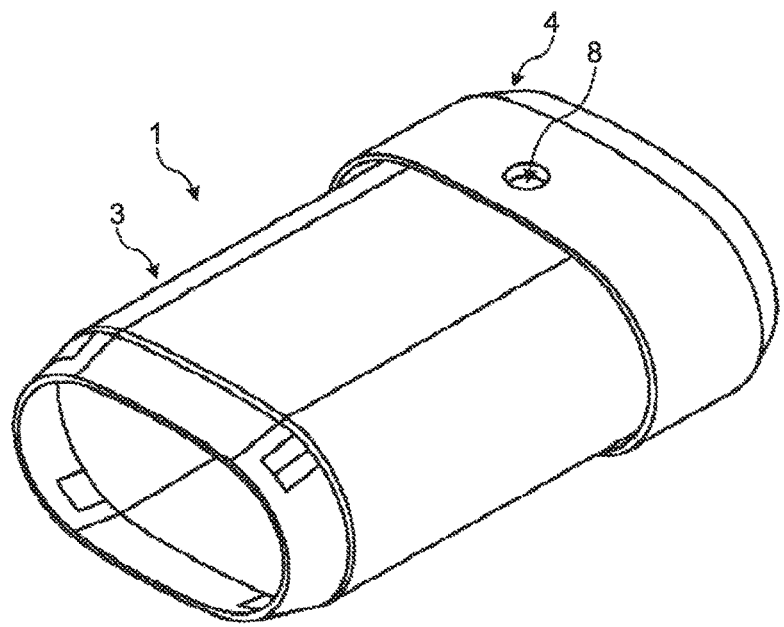
FIG. 10 is a perspective view of another shield connector according to the third modification of the embodiment.

A third modification of the embodiment will now be described. FIG. 9 is a perspective view of a shield connector according to the third modification of the embodiment. FIG. 10 is a perspective view of another shield connector according to the third modification of the embodiment. In the shield connector 1 according to the third modification, the ring 4 and the shield shell 3 are joined with each other by a punching process. For example, a hole 8 is formed using a punch, while the braided conductor 2 and the shield shell 3 are fitted to the ring 4. By performing the hole opening process, the ring 4 and the shield shell 3 are joined with each other. The hole 8 is formed so as to penetrate through the ring 4 and the shield shell 3. It is to be noted that instead of forming the hole 8, a recessed part may also be formed on the ring 4 and the shield shell 3 by the punching process.

Fourth Modification of Embodiment

Figure 11:
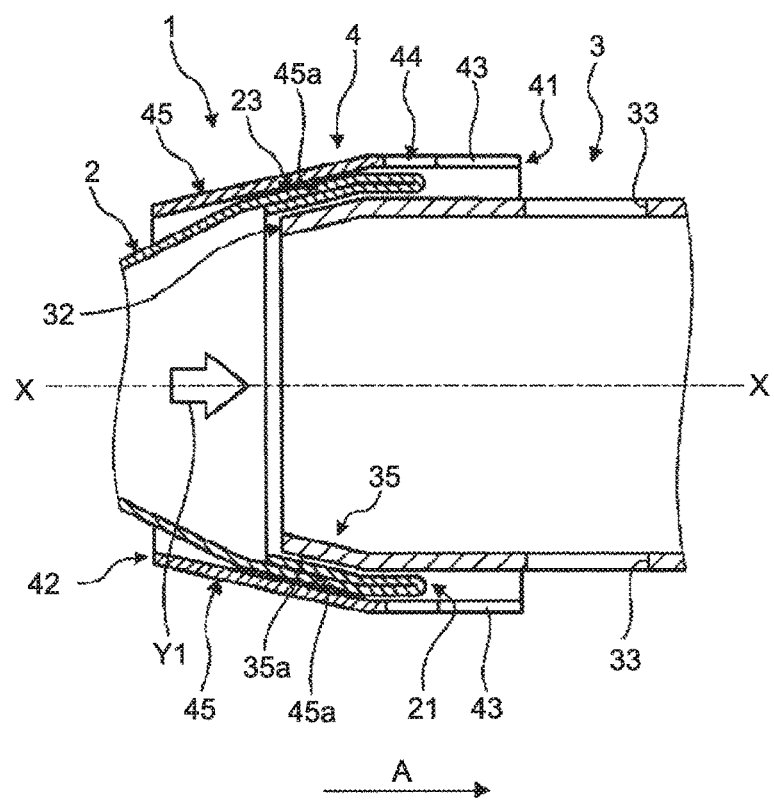
FIG. 11 is a sectional view of a shield connector according to a fourth modification of the embodiment.

A fourth modification of the embodiment will now be described. FIG. 11 is a sectional view of a shield connector according to the fourth modification of the embodiment. The fourth modification differs from the embodiment described above in that the shield shell 3 includes a tapered part 35.

As illustrated in FIG. 11, the tapered part 35 is provided at the rear end 32 side of the shield shell 3. The tapered part 35 is formed in a tapered-shape in which the cross-sectional area is reduced toward the rear end 32 side in the axial direction X. The cross-sectional shapes of the tapered part 35 at the positions in the axial direction X are formed so as to be similar to one another. The outer surface of the tapered part 35 is a support surface 35a, and the support surface 35a and the pressing surface 45a of the ring 4 interpose the braided conductor 2 therebetween. The support surface 35a faces the pressing surface 45a of the ring 4 in the axial direction X. The support surface 35a is inclined relative to the axial direction X on a section in the axial direction X.

The pressing surface 45a of the ring 4 is assembled to the shield shell 3 while the braided conductor 2 is interposed between the pressing surface 45a and the support surface 35a of the shield shell 3. The ring 4 is fixed to the shield shell 3 so that the pressing surface 45a keeps pressing the braided conductor 2 toward the support surface 35a even after caulking. When the support surface 35a is an inclined surface as in the present modification, the two surfaces that face each other interpose the braided conductor 2 from both sides. Consequently, the concentration of compressive stress is hard to occur in the braided conductor 2.

Fifth Modification of Embodiment

Figure 12:
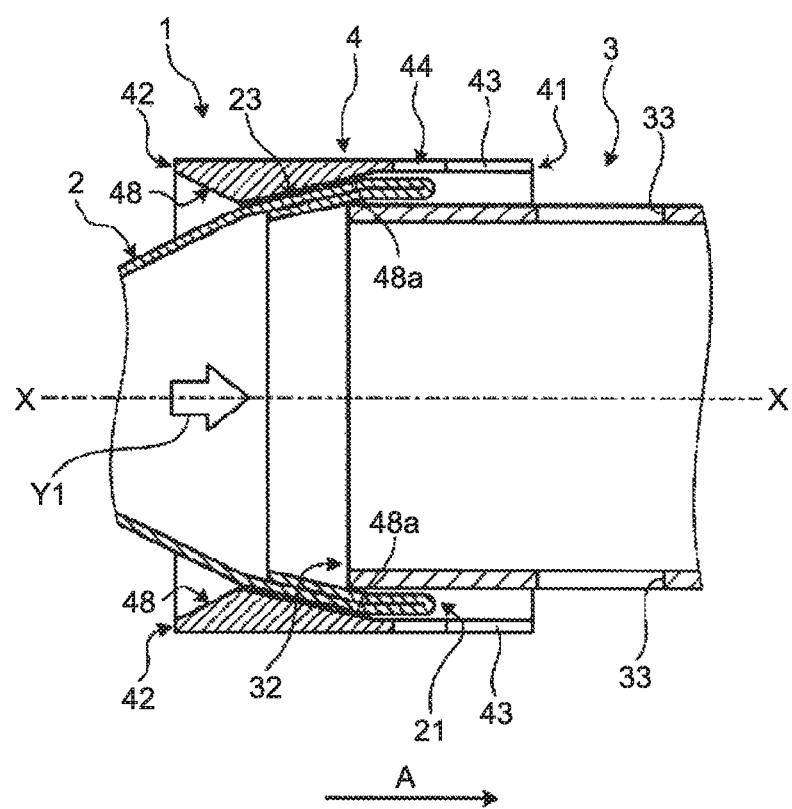
FIG. 12 is a sectional view of a shield connector according to a fifth modification of the embodiment.

A fifth modification of the embodiment will now be described. FIG. 12 is a sectional view of a shield connector according to the fifth modification of the embodiment. The fifth modification differs from the embodiment described above in that the ring 4 includes a projection 48 instead of the tapered part 45.

As illustrated in FIG. 12, the projection 48 that projects inwardly in the radial direction is disposed on the inner surface side of the ring 4. The projection 48 is disposed at the rear end 42 side of the ring 4. The projection 48 is continuously formed on the inner surface of the ring 4 over the entire periphery. The projection 48 includes a pressing surface 48a. The pressing surface 48a is an inclined surface inclined toward the inside in the radial direction from the front end 41 side to the rear end 42 side. The pressing surface 48a faces the rear end 32 of the shield shell 3 in the axial direction X. Similar to the pressing surface 45a in the embodiment described above, the pressing surface 48a and the shield shell 3 interpose the braided conductor 2 therebetween over the entire periphery. The ring 4 is fixed to the shield shell 3 so that the pressing surface 48a keeps pressing the braided conductor 2 toward the shield shell 3 even after caulking. The shape of the pressing surface 48a is not limited to the shape exemplified. For example, the pressing surface 48a may be curved so that the sectional shape thereof in the axial direction X has an arc-shape.

Sixth Modification of Embodiment

Figure 13A:
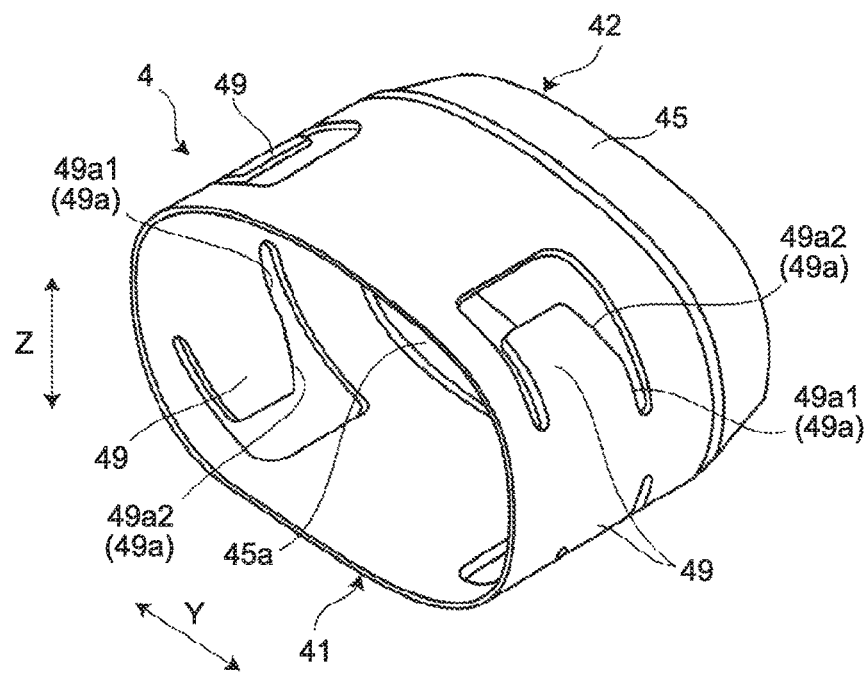
FIG. 13A is a perspective view of a ring according to a sixth modification of the embodiment.
Figure 13B:
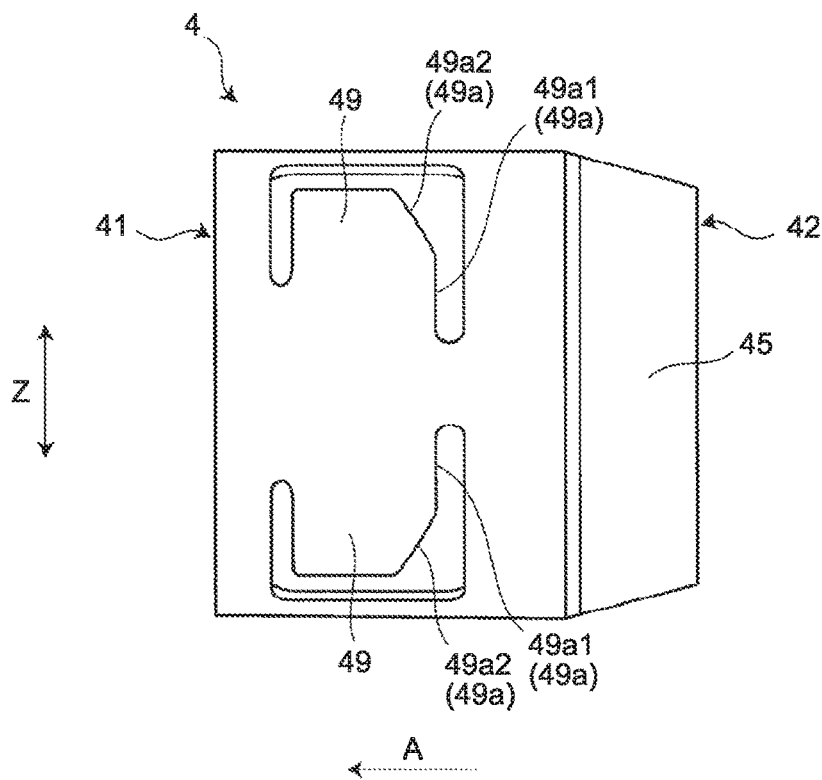
FIG. 13B is a side view of a ring according to a sixth modification of the embodiment.
Figure 14:
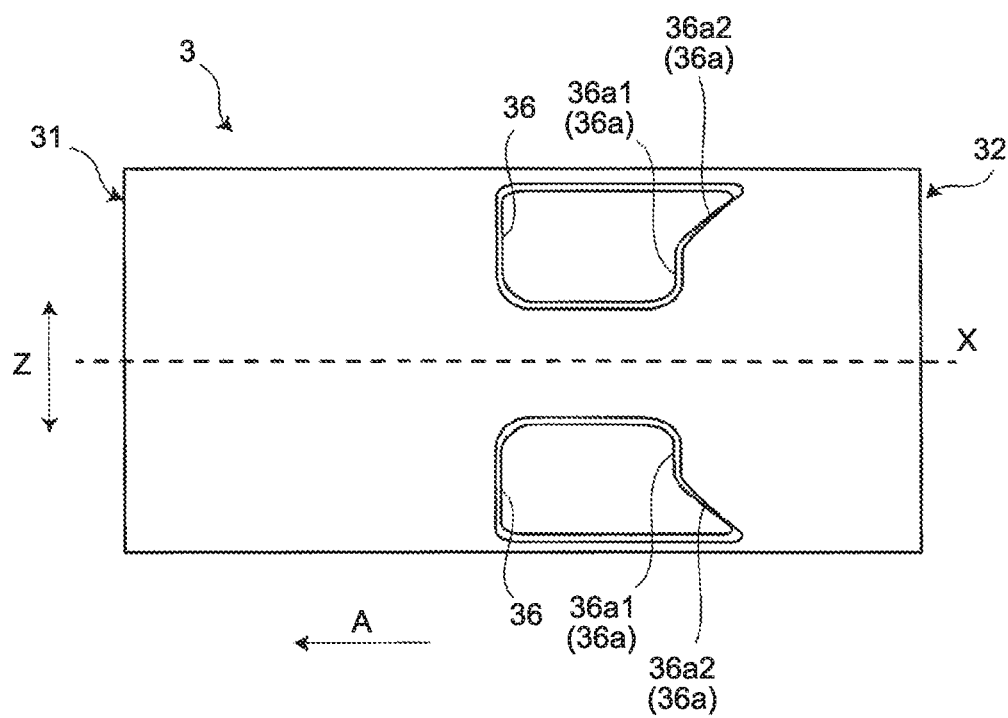
FIG. 14 is a side view of a shield shell according to the sixth modification of the embodiment.
Figure 15:
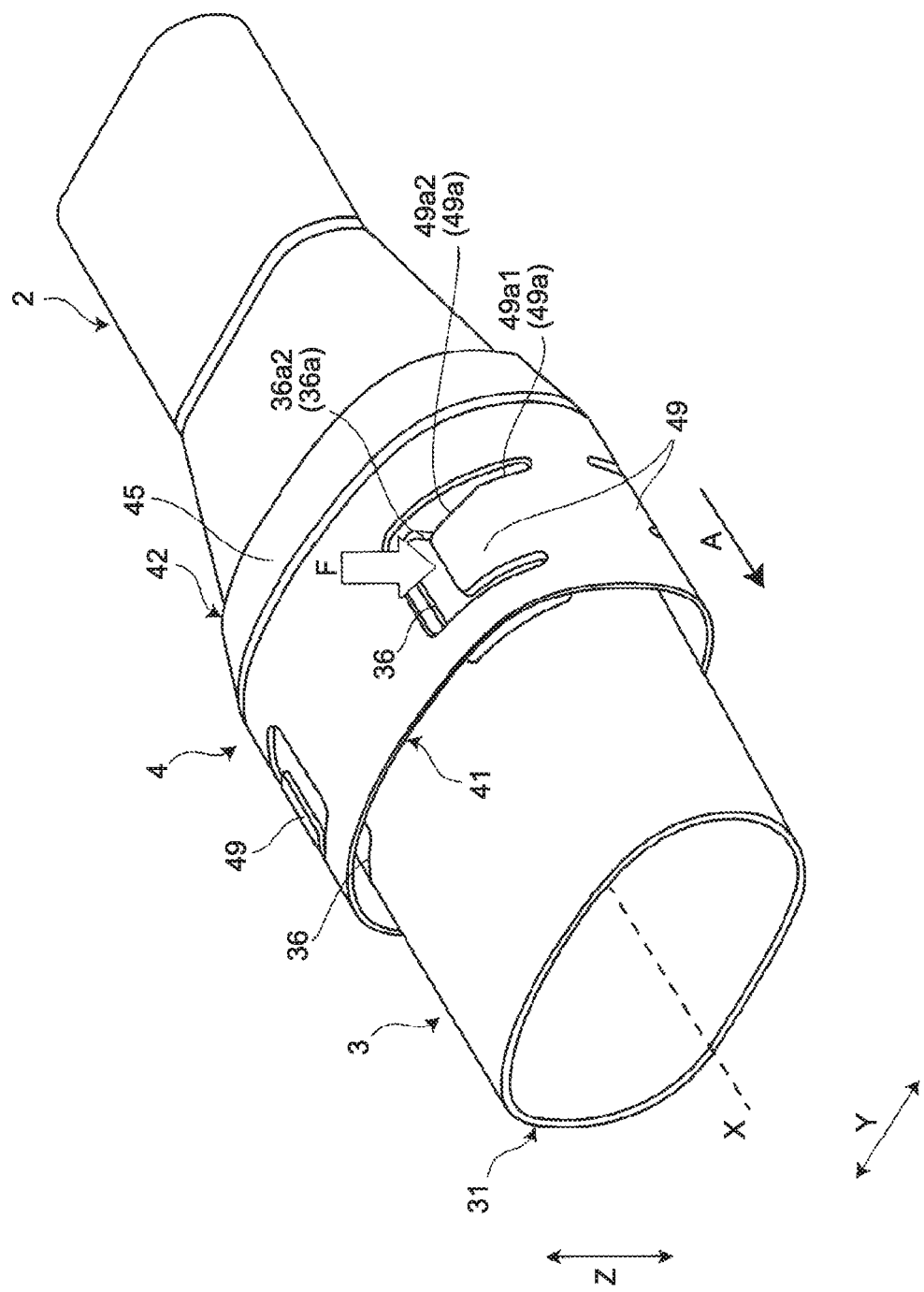
FIG. 15 is a perspective view for explaining an assembly of a shield connector in the sixth modification of the embodiment.
Figure 16:
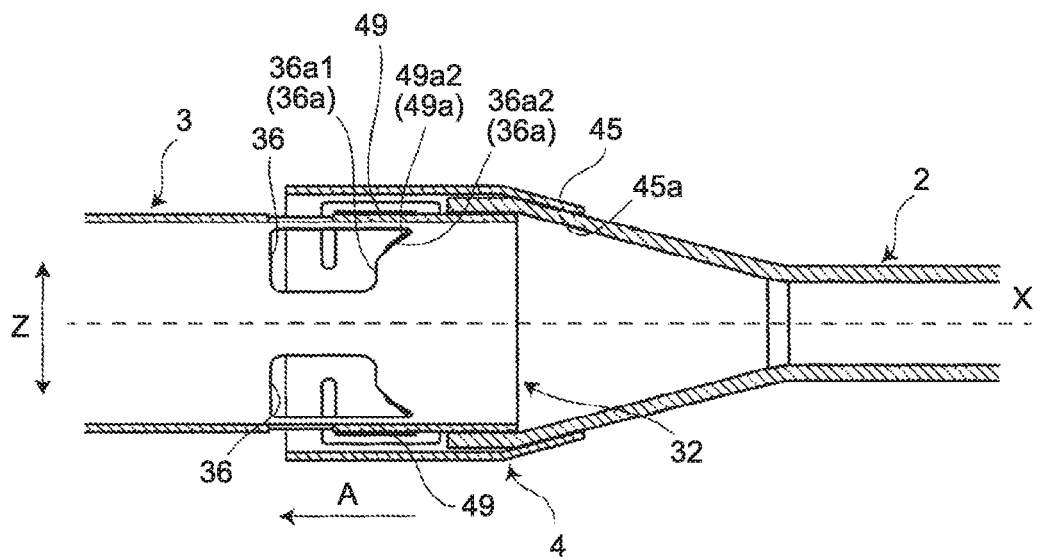
FIG. 16 is a sectional view for explaining the assembly of the shield connector in the sixth modification of the embodiment.
Figure 17:
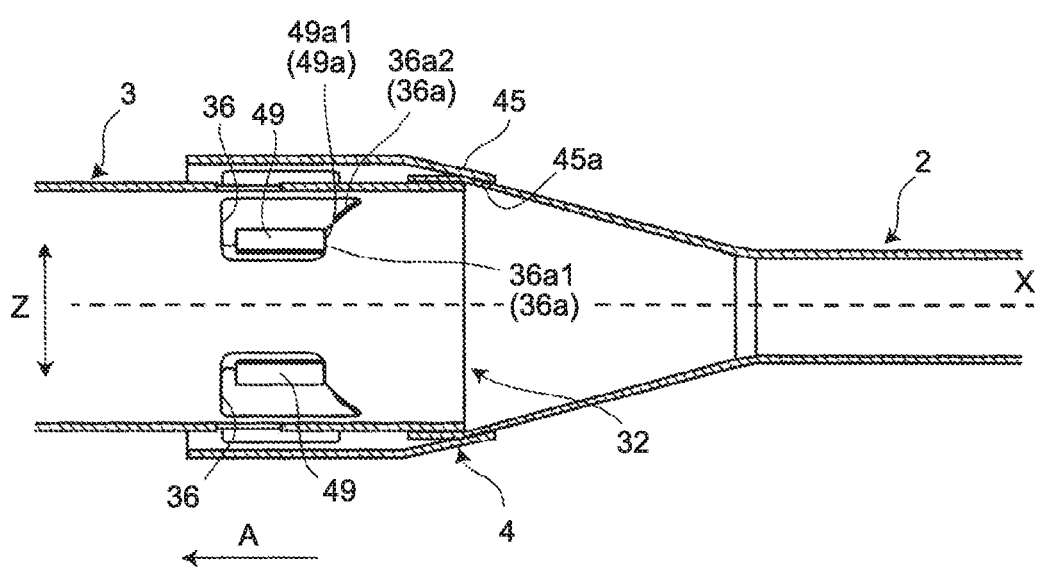
FIG. 17 is a sectional view for explaining the assembly of the shield connector in the sixth modification of the embodiment.

A sixth modification of the embodiment will now be described. FIG. 13A is a perspective view of a ring according to a sixth modification of the embodiment. FIG. 13B is a side view of a ring according to a sixth modification of the embodiment. FIG. 14 is a side view of a shield shell according to the sixth modification of the embodiment. FIG. 15 is a perspective view for explaining an assembly of a shield connector in the sixth modification of the embodiment. FIG. 16 is a sectional view for explaining the assembly of the shield connector in the sixth modification of the embodiment. FIG. 17 is a sectional view for explaining the assembly of the shield connector in the sixth modification of the embodiment. The shield connector 1 of the sixth modification differs from that of the embodiment described above in having a hole part 36 in the shield shell 3 and a hooking part 49 in the ring 4.

In the ring 4 of the sixth modification, a pair of hooking parts 49 and 49 extend in a direction separating from each other in the circumferential direction. A C-shaped hole part is formed on the ring 4 so as to leave the hooking part 49. The pair of hooking parts 49 and 49 are disposed so that the base end parts are adjacent to each other. The pair of hooking parts 49 and 49 project in a direction away from the other hooking part 49 in the circumferential direction. The pair of hooking parts 49 and 49 are disposed on end portions of the ring 4 in the lateral direction Y, and face each other in the height direction Z. That is, the pair of hooking parts 49 and 49 are disposed on the ring 4 at portions with a large curvature, in other words, at portions where the degree of curvature is sharp.

In the individual hooking part 49, a side edge part 49a at the rear side in the assembly direction A extends in the circumferential direction from the base end part to the tip end part. The side edge part 49a at the rear side includes a straight shape part 49a1 that extends in the circumferential direction in a linear manner, in an area at the base end part side. Moreover, the side edge part 49a at the rear side includes a tapered shape part 49a2 that is inclined relative to the circumferential direction, in an area at the tip end part side. The tapered shape part 49a2 is inclined in the assembly direction A toward the tip end part of the hooking part 49. The tapered shape part 49a2 is continuously formed from the straight shape part 49a1.

Two sets of the pair of hooking parts 49 and 49 are formed on the ring 4. The two sets of the hooking parts 49 and 49 face each other in the lateral direction Y.

A pair of the hole parts 36 and 36 are formed in the shield shell 3. The pair of hole parts 36 and 36 are each formed in a square shape, and are provided adjacent to each other in the circumferential direction. When the ring 4 is mounted on the shield shell 3, the pair of hole parts 36 and 36 are formed on the positions that face the pair of hooking parts 46 and 46. In other words, the pair of hole parts 36 and 36 are disposed at end portions of the shield shell 3 in the lateral direction Y, and face each other in the height direction Z. Consequently, the pair of hole parts 36 and 36 are disposed on the shield shell 3 at portions with a large curvature, in other words, at portions where the degree of curvature is sharp.

In the individual hole part 36, a side edge part 36a at the rear side in the assembly direction A extends in the circumferential direction. The side edge part 36a at the rear side includes a straight shape part 36a1 that extends in the circumferential direction in a linear manner, in an area at a side close to the other hole part 36. Moreover, the side edge part 36a at the rear side includes a tapered shape part 36a2 inclined relative to the circumferential direction, in an area at a side further away from the other hole part 36. The tapered shape part 36a2 is inclined in a direction opposite to the assembly direction A as being away from the other hole part 36. The tapered shape part 36a2 is continuously formed from the straight shape part 36a1.

Two sets of the pair of hole parts 36 and 36 as described above are formed in the shield shell 3. The two sets of the hole parts 36 and 36 face each other in the lateral direction Y.

Hereinafter, an assembly method of the shield connector 1 according to the sixth modification of the embodiment will be described. As illustrated in FIG. 15 and FIG. 16, in the shield connector 1 according to the sixth modification of the embodiment, similar to the embodiment described above, the ring 4 through which the braided conductor 2 is inserted is assembled to the shield shell 3. The ring 4 covers the rear end 32 side of the shield shell 3 so that the braided conductor 2 is interposed between the ring 4 and the shield shell 3.

The ring 4 is set at a position where the hooking part 49 of the ring 4 is overlapped with the hole part 36 of the shield shell 3. When the hooking part 49 and the hole part 36 are overlapped with each other in the height direction Z, the caulking process for folding the pair of hooking parts 49 and 49 is performed. In the caulking process, an external force F in the height direction Z is applied toward the hollow part in the ring 4, relative to the individual hooking part 49. The hooking part 49 applied with the external force F is folded in the radial direction, and is inserted into the hole part 36.

When the hooking part 49 is folded, the side edge part 49a of the hooking part 49 is pressed against the side edge part 36a of the hole part 36. More specifically, the tapered shape parts 36a2 and 49a2 are set at the side edge parts 36a and 49a. Consequently, the tapered shape part 49a2 of the hooking part 49 is pressed against the tapered shape part 36a2 of the hole part 36 so as the tapered shape part 49a2 intersect with the tapered shape part 36a2 of the hole part 36. When the tapered shape part 49a2 of the hooking part 49 is pressed against the tapered shape part 36a2 of the hole part 36, a component force caused by the external force F is generated in the hooking part 49. The component force corresponds to the force in the axial direction X (more specifically, the assembly direction A), and the ring 4 is biased in the assembly direction A by the component force in the axial direction X.

When the hooking part 49 is folded more, an intersection between the side edge parts 36a and 49a in the tapered shape parts 36a2 and 49a2 moves to the straight shape parts 36a1 and 49a1 side. The component force in the axial direction X is similarly generated in the hooking part 49, while the tapered shape part 49a2 of the hooking part 49 is pressed against the tapered shape part 36a2 of the hole part 36.

When the ring 4 is biased in the assembly direction A by the component force in the axial direction X, the ring 4 moves toward the shield shell 3, and is fitted to the shield shell 3. The ring 4 is pressed toward the shield shell 3 side, while the ring 4 and the rear end 32 of the shield shell 3 interpose the braided conductor 2 therebetween. As illustrated in FIG. 16 and FIG. 17, the pressing surface 45a of the ring 4 faces the rear end 32 of the shield shell 3 in the axial direction X, and the pressing surface 45a and the rear end 32 interpose the braided conductor 2 therebetween.

Finally, the hooking part 49 is folded until the base end portion is bent substantially at right angle. In this state, the hooking part 49 projects into the hollow part of the shield shell 3 via the hole part 36. Moreover, the intersection between the side edge part 49a of the hooking part 49 and the side edge part 36a of the hole part 36 reaches the straight shape parts 36a1 and 49a1.

The folded hooking part 49 is engaged to the hole part 36 by an engaging force between the straight shape parts 36a1 and 49a1, and restricts the relative movement of the ring 4 relative to the shield shell 3 in the disengaging direction. Moreover, the ring 4 is fixed to the shield shell 3 in the axial direction X, while the ring 4 is pressing the braided conductor 2 against the shield shell 3. In other words, the straight shape parts 36a1 and 49a1 restrict the relative movement of the shield shell 3 and the ring 4 in the axial direction X, and maintain the electrical connection state between the braided conductor 2 and the shield shell 3. In the present embodiment, the caulking structure in which the shield shell 3 and the ring 4 are caulked is configured so that the compressive stress in the axial direction X still remains in the braided conductor 2 after caulking. Consequently, even when the caulking process is finished, the state in which the pressing surface 45a and the shield shell 3 press the braided conductor 2 in the axial direction X is maintained.

In the sixth modification of the embodiment, the tapered shape parts 36a2 and 49a2 are set in the side edge part 49a of the hooking part 49 and the side edge part 36a of the hole part 36. With this configuration, the external force F in the height direction Z is applied to the hooking part 49, and thus the component force in the axial direction X is applied to the hooking part 49. Because the ring 4 is biased in response to the component force, the ring 4 moves in the assembly direction A, and presses the braided conductor 2 toward the shield shell 3 in the axial direction X. Consequently, it is possible to press the ring 4 toward the shield shell 3 via the braided component 2, by only caulking the hooking part 49 by the external force F. Thus, because it is possible to perform the pressing process and the caulking process at the same time, for example, it is possible to simplify the manufacturing process and simplify the manufacturing facility, by using a hand press and the like. Moreover, because the assembly is carried out by caulking, it is possible to perform the assembly without using a complicated method such as using a core. In the present modification, the hole part 36 and the hooking part 49 each function as biasing means for biasing the ring 4, to press the braided conductor 2 toward the shield shell 3 in the axial direction X.

In the present modification, the tapered shape parts 36a2 and 49a2 are set at the respective side edge part 36a of the hole part 36 and the side edge part 49a of the hooking part 49. However, the tapered shape parts 36a2 and 49a2 may also be set at only one of the side edge part 36a of the hole part 36 and the side edge part 49a of the hooking part 49. Even in this case, the component force in the axial direction X is applied to the hooking part 49 due to the shape of the tapered shape parts 36a2 and 49a2, and the ring 4 is biased in response to the component force. As a result, one of the ring 4 and the shield shell 3 moves relative to the other, and thus, it is possible to press the braided conductor 2 toward the shield shell 3 in the axial direction X.

Moreover, the side edge part 36a of the hole part 36 and the side edge part 49a of the hooking part 49 further include the straight shape parts 36a1 and 49a1 connected to the tapered shape parts 36a2 and 49a2. The folded hooking part 49 is engaged to the hole part 36 by the engagement force between the straight shape parts 36a1 and 49a1. By maintaining the engaging state of the straight shape parts 36a1 and 49a1, it is possible to keep the position of the ring 4 while having a spring property. As a result, even in an environment in which thermal deformation occurs, it is possible to obtain an even compressive stress in the braided conductor 2.

All of the side edge part 49a of the hooking part 49 and the side edge part 36a of the hole part 36 may be configured by the tapered shape parts 36a2 and 49a2. However, by providing the straight shape parts 36a1 and 49a1, it is possible to obtain the above-described effects.

Seventh Modification of Embodiment

A seventh modification of the embodiment will now be described. Means for fixing the ring 4 to the shield shell 3 is not limited to those exemplified in the embodiment and the modifications described above. For example, the ring 4 may be pressed against and fixed to the shield shell 3 by an elastic force of an elastic member such as a rubber and a spring.

Figure 18:
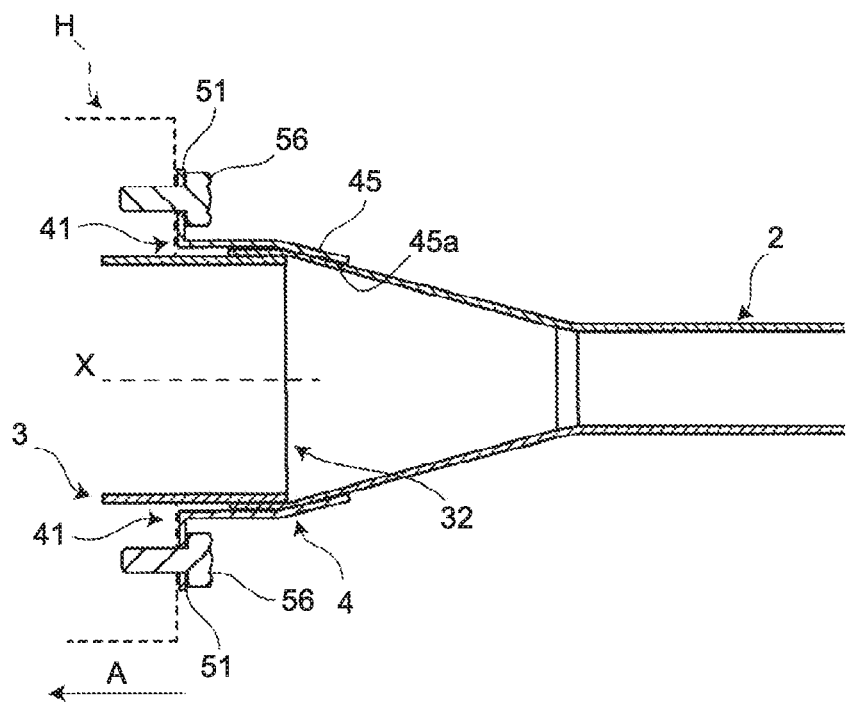
FIG. 18 is a sectional view of a shield connector according to a seventh modification of the embodiment.

FIG. 18 is a sectional view of a shield connector according to the seventh modification of the embodiment. The shield connector 1 illustrated in FIG. 18 includes a fastening tool 56 such as a bolt as the biasing means for biasing the ring 4. The fastening tool 56 penetrates through a flange part 51 provided on the front end 41 of the ring 4 and is fastened to a housing H of a power supply unit and the like. Because the ring 4 is fastened to the housing H, the fastening tool 56 biases the ring 4 in the assembly direction A by using the fastening force obtained when the fastening tool 56 is fastened. Consequently, the ring 4 is capable of pressing the braided conductor 2 toward the shield shell 3 in the axial direction X.

Figure 19:
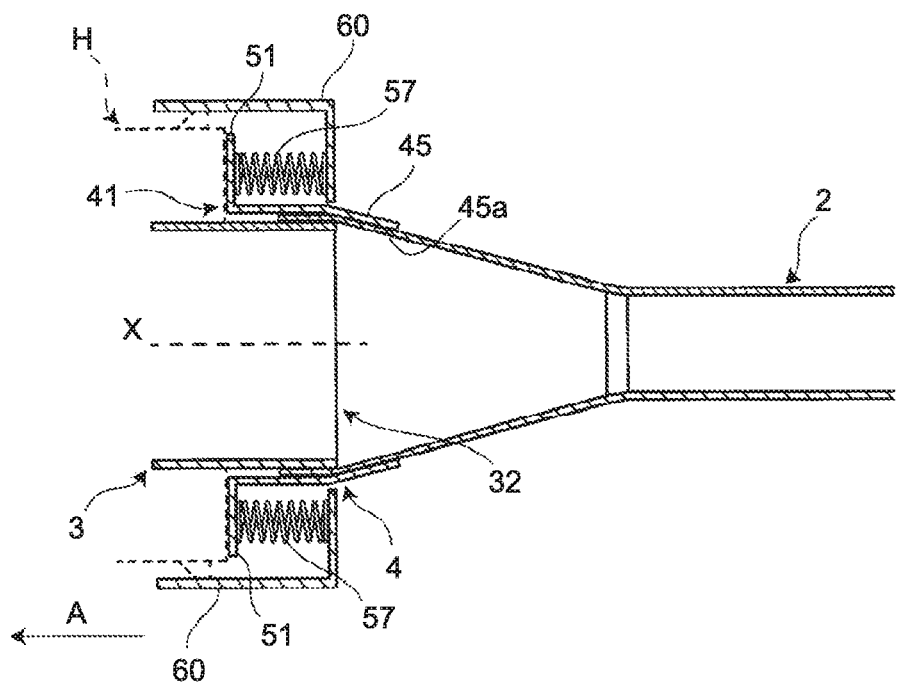
FIG. 19 is a sectional view of the shield connector according to the seventh modification of the embodiment.

FIG. 19 is a sectional view of the shield connector according to the seventh modification of the embodiment. The shield connector 1 illustrated in FIG. 19 includes an elastic member 57 such as a spring, as the biasing means for biasing the ring 4. The elastic member 57 is provided between the flange part 51 provided on the front end 41 of the ring 4 and a cover 60 that covers the outer periphery of the ring 4. The cover 60 is attached to the housing H, and the position of the cover 60 is fixed. The elastic member 57 biases the ring 4 in the assembly direction A by its own reaction force. Consequently, the ring 4 is capable of pressing the braided conductor 2 toward the shield shell 3 in the axial direction X.

The contents disclosed in the embodiment and the modifications described above may be executed by suitably combining them.

A shield connector according to the present embodiment includes a braided conductor through which an electric wire is inserted; a shield shell formed in a tubular shape that has conductivity; and a ring formed in a tubular shape in which a pressing surface that faces the shield shell in an axial direction of the shield shell is formed on an inner surface side over an entire periphery. The pressing surface is inclined in a direction intersecting with the axial direction on a section in the axial direction. The ring is fixed to the shield shell while maintaining a state in which the pressing surface presses the braided conductor against the shield shell in the axial direction over the entire periphery. In the shield connector according to the present embodiment, the ring is fixed to the shield shell while maintaining the state in which the inclined pressing surface presses the braided conductor against the shield shell in the axial direction over the entire periphery. Consequently, the shield connector according to the present embodiment achieves an advantageous effect of being able to suppress variations in the contact state of the braided conductor relative to the shield shell.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A shield connector, comprising:
a braided conductor through which an electric wire is inserted;
a shield shell formed in a tubular shape that has conductivity;
a ring formed in a tubular shape in which a pressing surface that faces the shield shell in an axial direction of the shield shell is formed on an inner surface side over an entire periphery, wherein
the pressing surface is inclined in a direction intersecting with the axial direction on a section in the axial direction,
the ring is fixed to the shield shell while maintaining a state in which the pressing surface presses the braided conductor against the shield shell in the axial direction over the entire periphery,
the shield shell includes a hole part penetrating in a radial direction, and
the ring includes a hooking part that is folded toward a radial direction and fixed to the shield shell when the hooking part being folded is inserted into the hole part.

2. The shield connector according to claim 1, wherein the hooking part is a chip that is formed on the ring and extends in a circumferential direction, being folded in a radial direction and inserted into the hole part.

3. The shield connector according to claim 1, wherein the shield shell includes a support surface, the support surface and the pressing surface interposing the braided conductor therebetween, and
the support surface is inclined in a direction intersecting with the axial direction on a section in the axial direction.

4. The shield connector according to claim 2, wherein the shield shell includes a support surface, the support surface and the pressing surface interposing the braided conductor therebetween, and
the support surface is inclined in a direction intersecting with the axial direction on a section in the axial direction.

5. A shield connector, comprising:
a braided conductor through which an electric wire is inserted;
a shield shell formed in a tubular shape that has conductivity;
a ring formed in a tubular shape in which a pressing surface that faces the shield shell in an axial direction of the shield shell is formed on an inner surface side over an entire periphery, wherein
biasing means for biasing the ring to press the braided conductor toward the shield shell in the axial direction, the biasing means being provided on at least one of the ring and the shield shell;
the pressing surface is inclined in a direction intersecting with the axial direction on a section in the axial direction,
the ring is fixed to the shield shell while maintaining a state in which the pressing surface presses the braided conductor against the shield shell in the axial direction over the entire periphery,
the shield shell includes a hole part penetrating in a radial direction,
the ring includes a hooking part folded inwardly in the radial direction and inserted into the hole part,
the biasing means includes the hole part and the hooking part, and at least one of the hole part and the hooking part includes a tapered shape part inclined relative to a circumferential direction, on at least a part of a side edge part extending in the circumferential direction, and
the biasing means generates a component force in the axial direction in the hooking part, when a side edge part of the hooking part being folded is pressed against a side edge part of the hole part.

6. The shield connector according to claim 5, wherein at least one of the hole part and the hooking part further includes a straight shape part that extends in a circumferential direction and is connected to the tapered shape part.

\* \* \* \* \*